United States Patent

[11] 3,609,229

[72] Inventors Virgilio Mosca
Via Cesare Batteste 11;
Maria Bonfa, Via Orazio 7, both of Milan, Italy

[21] Appl. No. 769,445
[22] Filed Oct. 21, 1968
[45] Patented Sept. 28, 1971
[32] Priority Oct. 26, 1967
[33] Italy
[31] 22019A/67

[54] APPARATUS FOR THE HIGH-SPEED TRANSMISSION AND RECEPTION OF TWO-LEVEL IMAGES
2 Claims, 2 Drawing Figs.

[52] U.S. Cl. .......... 178/6.8
[51] Int. Cl. .......... H04n 3/32
[50] Field of Search .......... 178/6.8, DIG. 3

[56] References Cited
UNITED STATES PATENTS

| | | | |
|---|---|---|---|
| 2,752,421 | 6/1956 | Ross | 178/6.8 |
| 3,229,033 | 1/1966 | Artzt | 178/6 |
| 3,333,056 | 7/1967 | Pratt | 178/6.8 |
| 3,339,017 | 8/1967 | Quinlan | 178/6.8 |

*Primary Examiner*—Robert L. Griffin
*Assistant Examiner*—Richard K. Eckert, Jr.
*Attorneys*—Guido Modiano and Albert Josif

ABSTRACT: This disclosure relates to an apparatus for the high-speed transmission and reception of two-level images in which a video signal is transmitted to a receiver and scanned in order to detect the presence of level transitions, the scanning point being stopped upon detection of a level transition for the time necessary to send an impulse to the receiver and then caused to continue its motion at high speed.

Figure 1:
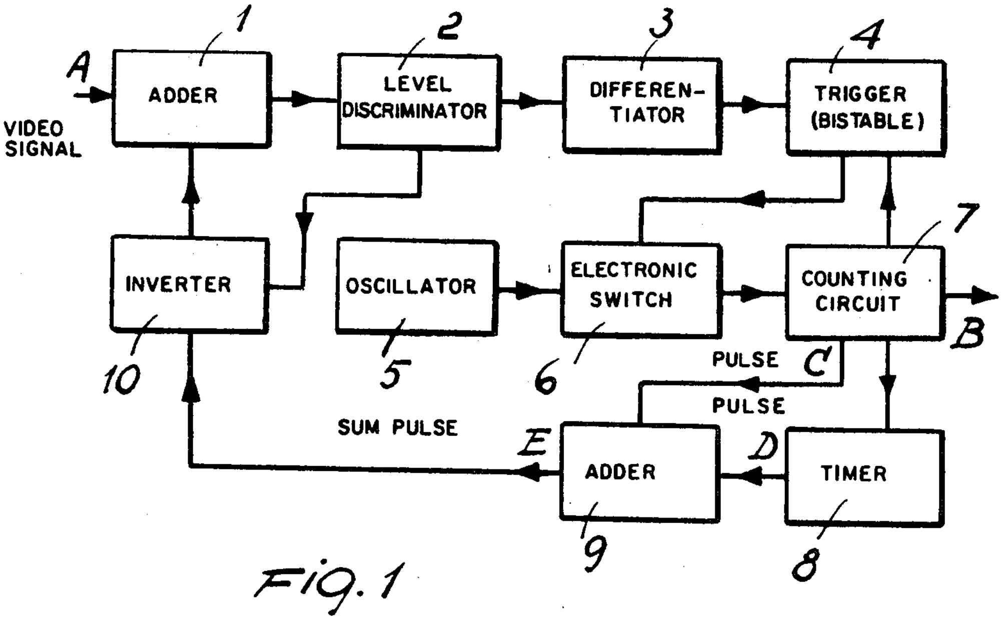

INVENTORS
VIRGILIO MOSCA
MARIA BONFA'
BY Albert Josif
Agent

APPARATUS FOR THE HIGH-SPEED TRANSMISSION AND RECEPTION OF TWO-LEVEL IMAGES

BACKGROUND OF THE INVENTION

The theoretical and practical principles which have been suggested by various sources, for the transmission and reception of distant images are well-known More particularly methods and apparatus are known which, by limiting the possibility of the communication to two-level images (for instance, white and black) and sending only the basic information for the reconstruction of the image at the receiver, result in remarkable saving of transmitted band or of communication time, and consequently enable relatively low cost of communication. Such systems are particularly suitable for the transmission of images along the existing telephone lines.

More precisely, reference is made herein to a system and apparatus as described in the Italian Pat. No. 775,196, filed Aug. 6, 1966 in the name of Aurelio Beltrami, which, by scanning the two-level image by means of high-speed electronic and electro-optic devices, through television-type rasters, enables detection solely of the level transitions by sending their simultaneous signaling to the receiver. The transmission of such signaling is usually effected by means of electric pulses of a proper shape, whose duration, width and shape as explained in said Italian Pat. No. 775,196 is such as to be accepted by the available communication means. During the transmission of such pulses, the displacement velocity of the scanning spot is temporarily reduced.

The reconstruction of the image at the receiver as disclosed in said Italian Pat. No. 775,196 takes place due to the reception of the pulses signaling the level transitions and to the line synchronizing pulses; the latter cause the generation of flyback pulses of the two-speed line time base, effecting the deflection of the electronic beam of the receiving tube synchronously with that of the transmitting scanning system. As recited in said Italian Pat. No. 775,196, the frame synchronizing pulse, the transmission of only one frame each time being generally involved, usually is not transmitted; in this case, the generation of the frame time base is obtained, by means of the integration of the line pulses.

From the above-mentioned considerations, it clearly follows that, when the slowing down of the line time base of the receiver is not, with sufficient precision, equal to that of the transmitter, serious position errors will be noticed, in the reproduction of the image, since the scanning spot usually moves at high speed and since, at the end of each line, the sum of the errors made at each slowing down will be obtained.

Serious position errors may also be noted when the ratio between the two scanning speeds (the high and the low one) is not maintained identical at the transmitter and at the receiver.

Such faults have up to now prevented the production of practically usable apparatus.

The main object of the present invention is that of providing devices and arrangements of the described type which are such as to reduce positions errors due to the above mentioned causes to acceptable values which are, constant in time and, at any rate, less than a predetermined limit.

BRIEF SUMMARY OF THE INVENTION

According to one aspect of the invention the lower scanning speed is eliminated. Upon detection of a level transition by the scanning spot, the scanning spot is stopped in its detection position for the time necessary for the transmission of a pulse to the receiver, and then continues its motion as the higher scanning speed. It is thus possible to obviate one of the causes of the position error in the reconstruction of the line at the receiver, in which the image-reconstruction spot is also stopped in the position in which it is for an equal time.

These and other aspects of the invention will appear more clearly from the following detailed description illustrated by way of example in the following practical example.

Figure 2:
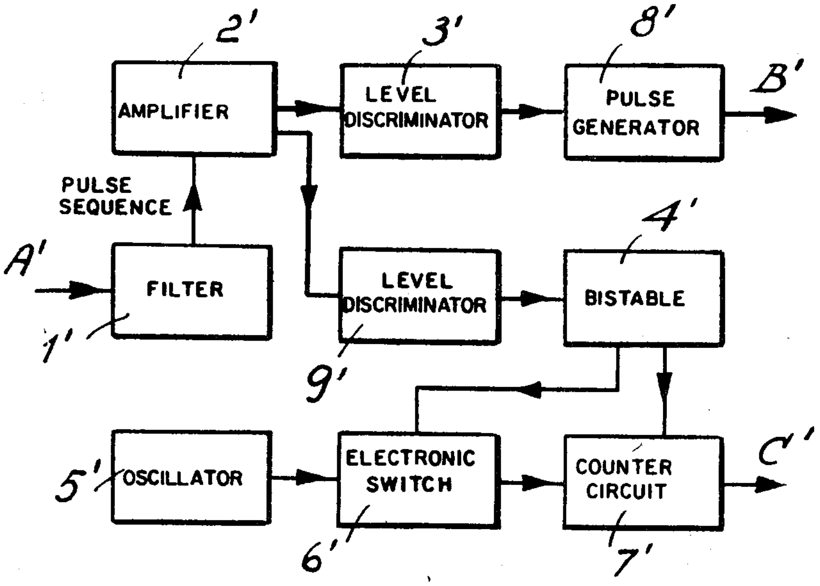

With reference to the accompanying drawings in which:

FIG. 1 is diagrammatic view of a transmitter constructed in accordance with the invention, and FIG. 2 is a diagrammatic view of a receiver constructed in accordance with the invention.

A two-level image having a surface equal to 130×180 mm. is supposed to be scanned by lines parallel to the shortest side, with a length equal to 130 mm. Moreover, a definition of 3 points per millimeter is desired, so that 390 points have to be scanned in a line. It is supposed that the number of level transitions which the spot may encounter in its movement is equal to 200 in all: such supposition usually proves quite sufficient in the transmission of handwritten and typewritten sheets, drawings and the like.

A duration of the line equal to 5 milliseconds is also established for the case in which the scanning spot should meet no level transition. The displacement velocity of the moving spot is thus of 130:0.005=26,000 mm./sec., that is of 26 meters per second. Each point of the image is then scanned in 0.005:390=12.8 microseconds.

The error to be tolerated must be preestablished. In the reported case, for example, the error of one point at the end of the line might be tolerated. 200 being the foreseen number of level transitions, the stopping time of each one must be determined with a maximum error of 12.8:200=0.064 microseconds.

If now the signal is supposed to be transmitted by means of pulses of 500 microseconds duration, this must be the stopping time of the scanning spot at each level transition. A timer of 500±0.064 microseconds must then be generated, both at the transmitter and receiver, with a precision of 0.064:500=1:7,800. Such precision may be obtained by counting the cycles of a frequency-stabilized oscillator.

For example, both at the transmitter and at the receiver, two crystal nonsynchronized controlled oscillators will be sued, whose frequency must be such that the errors caused by the possible beginning of countdown in any point of the cycle may not give rise to remarkable position errors.

In our case, the maximum position error allowed for each point is supposed to be of the order of one-third of a point, equal to 12.8:3=4.3 microseconds, half of which at the transmitter and half at the receiver; one cycle of the oscillator must then last 4.3:2=2.15 microseconds, with a frequency of about 465 kHz. Briefly speaking, the greater the frequency of the oscillator, the smaller the error. However, an increase in frequency will lead to an increase in the complexity of the counting stage which, already in the considered example, entails the counting of 500:2.15=232 cycles of the oscillator, in order to establish a time of 500 microseconds.

From all that is mentioned above, the transmitting apparatus, in respect of the part handling the video signal and the generation of the stopping time, may be as shown, by way of nonlimiting example, in FIG. 1 and the circuit may be well understood if reference is made to the prior art, as shown in said Italian Pat. No. 775,196. It is clear that a known type of scanning or pickup device is to set upstream of the block 1, the output signal of said device being the video signal A of FIG. 1.

In FIG. 1, the video signal A coming from the scanning device, crosses the adder 1, whose function will be described hereinafter and is then applied to the level discriminator 2. At the output of the discriminator 2, the video signal will be transformed into a signal with only two precise preestablished levels, with very fast transitions between one level and the other. The rise and the decay time of the signal, corresponding to the level transitions (for instance from white to black and from black to white) must both give rise to the generation of a stopping time, that is they must both start the countdown. Therefore, the rise and decay times which are obtained by differentiating the signal coming out of 2 in circuit 3, which also renders them of the same polarity, are sent to the trigger bistable circuit 4, which changes state, thus causing the closing of the controlled electronic switch 6, which is reached by the signal of the crystal-controlled oscillator 5, which is maintained in continuous operation. The cycles of the oscillator 5 are thus fed to the counting circuit 7, which may be of any suitable conventional type.

It is clear that from the output of the counting circuit 7 the pulse train B is sent to the available communication means, as already specified in the paragraph termed "Background of the Invention," as for instance the existing telephone lines and relative telephonic central stations or the Mertzian cable, as will be disclosed hereinafter.

From said counter a single pulse must come out, of duration equal to the preestablished stopping time, whose leading edge coincides with the beginning of a cycle of oscillator 5 and whose trailing edge will be sent to reset the bistable circuit 4. The bistable circuit 4 opens the controlled switch 6, thus preventing the further passage of the cycles of the oscillator 5 to the counter 7. The system is thus ready to restart the countdown in correspondence with a new signal coming from the level discriminator. The stopping pulses generated in the counter 7 are then sent both to stop the line time base and to control the transmission of the pulses to the receiver.

However, the level discriminator 2 must be adjusted in such a way that it cannot trip due to accidental causes, such as noise, fluctuation of the video signal and so on, during the whole stopping time added to the scanning time of one point of the image, run along at high speed (12.8 microseconds, in the reported example). The addition of such time, which may be generated by means of any timer circuit (such as a monostable multivibrator) having even modest precision, is necessary in order to allow the scanning spot to run along at least one point of the image before detecting a new level transition. The detection of details higher than those preestablished is thus avoided, by eliminating the cause of an unwanted increase of the total transmission time.

Again referring to FIG. 1, the falling edge of the pulse coming out of the counter actuates the timer 8. The two pulses C and D coming out of 7 and 8 are then added in adder 9, the sum pulse E is sent to the inverter circuit 10, which is controlled by the state of the level discriminator 2, which ensures that the pulse is always added, in circuit 1, with such a polarity as to keep circuit 2 in the position in which it is already, for the whole time of sum pulse E.

A further improvement of remarkable importance as regards the proposed methods is that of adopting new methods for the discrimination, at the receiver, of the line synchronizing pulses from the stopping pulses. Such discrimination, in fact, may be obtained by making such pulses discriminable in any way: in shape; amplitude, phase and duration. For example, the amplitude discrimination is very simple: the line synchronizing pulses are sent with the same shape, phase and duration, but different (for instance greater) amplitude, as the other pulses.

The portion of the receiving apparatus, dealing with the discrimination of the pulses of the two types and the precise regeneration of the stopping times, may be arranged as shown, by way of example, in FIG. 2.

It is understandable that in the receiving apparatus the pulse sequence A′ comes from the transmission system, and the output B′ is connected to the two-speed line time base circuit of the type disclosed in two-speed Italian Pat. No. 775,196, as will be seen hereinafter. The output C′ is connected to the line time base circuit known for instance from said Italian Pat. No. 775,196, as will be seen hereinafter.

In FIG. 2, the pulse sequence A′ reaching the receiver through the transmission system (physical cable, Hertzian cable or the like) is first filtered, if required, in circuit 1; in order to avoid outband disturbances. The signals are then amplified by a conventional amplifier 2′, equipped with a manual or automatic gain control of conventional type. The pulses coming out are then applied to two level discriminator circuits 3′ and 9′, which are preset for discrimination at different levels.

Circuit 3′ will ~~be~~ only excited by the greater pulses corresponding, in our example, to the line synchronizing pulses. The rise times of the signals coming out of 3′ are sent to trigger line flyback pulse generator 8′ (output B′ in FIG. 2). The latter are then sent to the two-speed line time base in order to cause its flyback.

Circuit 9′, on the contrary, is operated by all the arriving pulses, being preset at a lower level. The rise times of the signals coming out of 9′, set bistable circuit 4′, which, in turn, causes the closing of the electronic controlled switch 6′, which is reached by the signal of the crystal controlled oscillator 5′, which is maintained in constant operation and whose operating frequency must obviously be identical to that of oscillator 5 of FIG. 1, except for the normal typical errors of the adopted crystals. The cycles of the oscillator are thus fed to counter circuit 7′, which may be of any suitable type.

From said counter 7′ a single pulse must come out, of duration equal to the preestablished stopping time, whose leading edge coincides with the beginning of a cycle of the oscillator 5′ and whose trailing edge will be sent to reset the bistable circuit 4′. This latter opens the electronic controlled switch 6′, which thus prevents the further passage of the cycles of oscillator 5′ to counter 7′. The assembly is thus ready to restart the countdown in correspondence with a new signal coming from level discriminator 9′.

The stopping pulses generated in 7′ are then sent to stop the line time base (output C′ in FIG. 2).

We claim:

1. An apparatus for high-speed transmission and reception of two-level images, comprising a transmitting unit and a receiving unit, said transmitting unit including a video signal adding circuit, a discrimination circuit connected to said adding circuit for transforming said video signal into a signal at two constant preestablished levels, and a differentiating circuit connected to said discrimination circuit for producing unipolar spikes, wherein according to the improvement said transmitting unit further comprises a bistable circuit connected to said differentiating circuit and switchable in response to said spikes, a controlled switch connected to said bistable circuit and closable in response to the switching of said bistable circuit, a constantly operating oscillator connected to said controlled switch, a counter circuit connected to said controlled switch and capable of receiving signals transmitted through said controlled switch by said oscillator when said controlled switch is on, said counter circuit generating stopping pulses of preestablished duration for stopping the line time base and controlling the transmission of the pulses to a receiver, a timer connected to said counter circuit and actuated by the trailing edge of the pulse coming out of said counter circuit, a pulse adder connected to said counter circuit and to said timer for summing the pulses coming from said counter and said timer, an inverter circuit capable of receiving the sum pulse from said pulse adder and responsive to said discrimination circuit, said inverter circuit causing the adding of the sum pulse in said video signal adder circuit and maintaining said discrimination circuit in a constant state for the duration of said sum pulse.

2. An apparatus for high-speed transmission and reception of two-level images, comprising a transmitting unit and a receiving unit, wherein said receiving unit comprises a bandpass filter for eliminating outband noise from the signal arriving at said receiving unit, said signal being formed by said stopping pulses and line pulses which have the same duration, shape and phase but different amplitude, the amplitude of said stopping pulses being less than that of said line pulses, an amplifier provided with a gain control connected to said bandpass filter, a first and a second level discriminator circuits connected to said amplifier for transforming the signal into rectangular-type signals, said first and second discriminator circuits being set for discrimination at different levels, the first discriminator circuit being excited only by said line pulses and said second discriminator circuit being excited by said line pulses and said stopping pulses, a flyback pulse generator connected to said first discriminator circuit and adapted to being triggered by the leading edges of said line pulses, a bistable circuit trigger connected to said second discriminator circuit and capable of being switched in response to the leading edges of said line pulses and said stopping pulses, a controlled switch which is connected to said bistable trigger circuit and is able to be put on in response to the switching action of said bistable trigger circuit, a constantly operating oscillator connected to said controlled switch, a counter circuit connected to said controlled switch, said counter circuit receiving signals transmitted through said controlled switch by said oscillator when said controlled switch is on, said counter circuit being capable of generating a stopping pulse of preestablished duration for stopping said line time base which is identical to the corresponding stopping generated at said transmitter, said counter circuit being further connected to said bistable trigger circuit for the transmission of the trailing edge of said stopping pulse of preestablished duration to said bistable trigger circuit in order to reset the bistable trigger circuit and cause the opening of said controlled switch.